J. L. WOODBRIDGE.
SYSTEM OF ELECTRICAL DISTRIBUTION.
APPLICATION FILED JULY 28, 1906.

1,105,231.

Patented July 28, 1914.
2 SHEETS—SHEET 1.

J. L. WOODBRIDGE.
SYSTEM OF ELECTRICAL DISTRIBUTION.
APPLICATION FILED JULY 28, 1906.

1,105,231.

Patented July 28, 1914.

2 SHEETS—SHEET 2.

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

1,105,231.  Specification of Letters Patent.  Patented July 28, 1914.

Application filed July 28, 1906. Serial No. 328,159.

*To all whom it may concern:*

Be it known that I, JOSEPH LESTER WOODBRIDGE, a citizen of the United States, and a resident of Philadelphia, in the county of Philadelphia and State of Pennsylvania, have invented a certain new and useful System of Electrical Distribution, of which the following is a specification.

The objects of the present invention are to provide for the proper regulation of a dynamo machine or booster; to provide means for controlling a booster field in response to small variations in the circuit to be regulated; to provide comparatively simple and inexpensive means for supplying a larger amount of energy for controlling the excitation of the booster field than is availed of for operating the regulating means, and to provide simple, reliable and efficient means for magnifying the effect of small circuit variation so as to cause the same to be sufficient for regulating the booster field.

To these and other ends hereinafter set forth the invention stated in general terms comprises the improvements to be presently described and finally claimed.

The nature, characteristic features and scope of my invention will be more fully understood from the following description taken in connection with the accompanying drawings forming part hereof, and in which—

Figure 1:
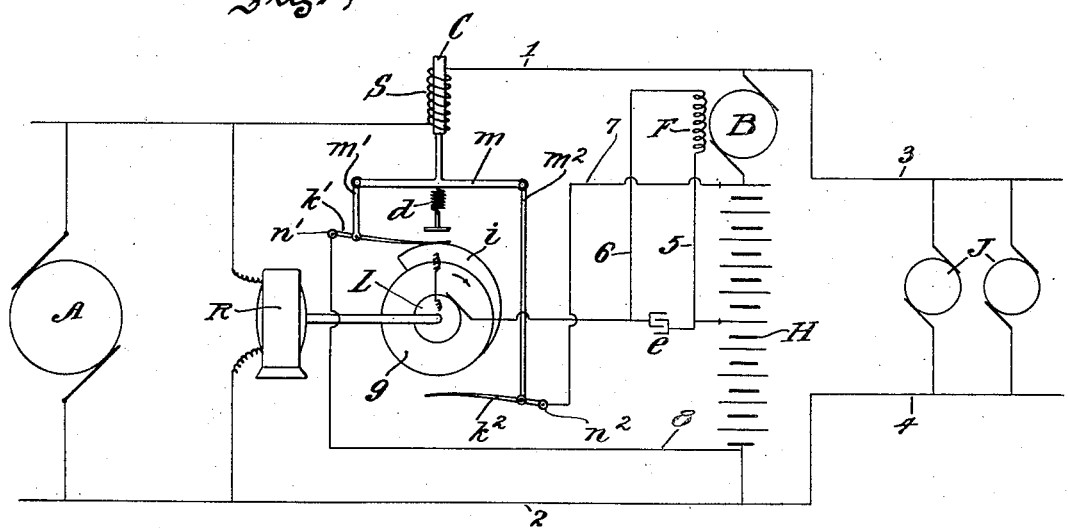
Figure 2:
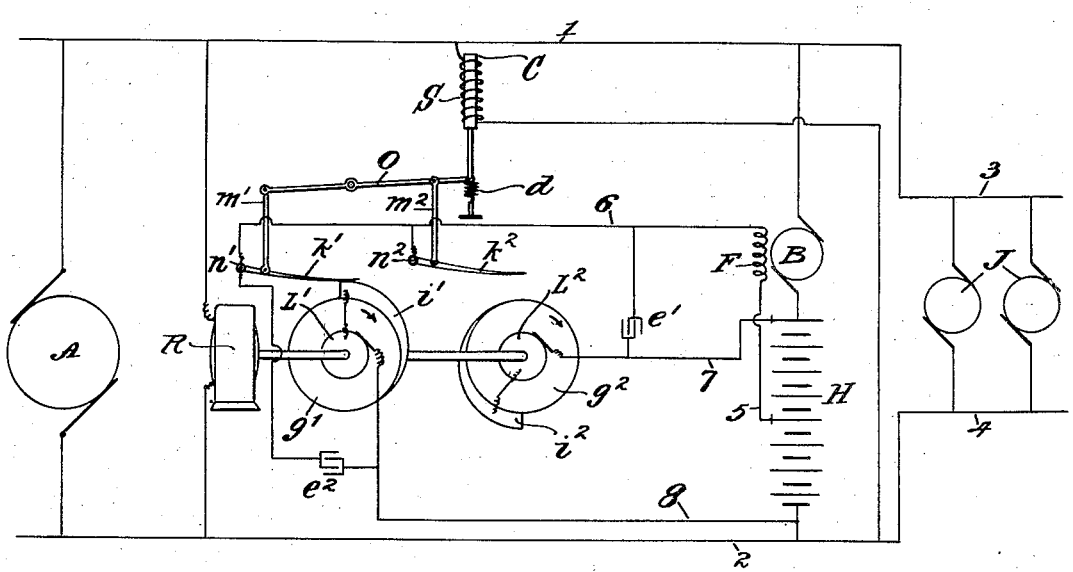
Figure 3:
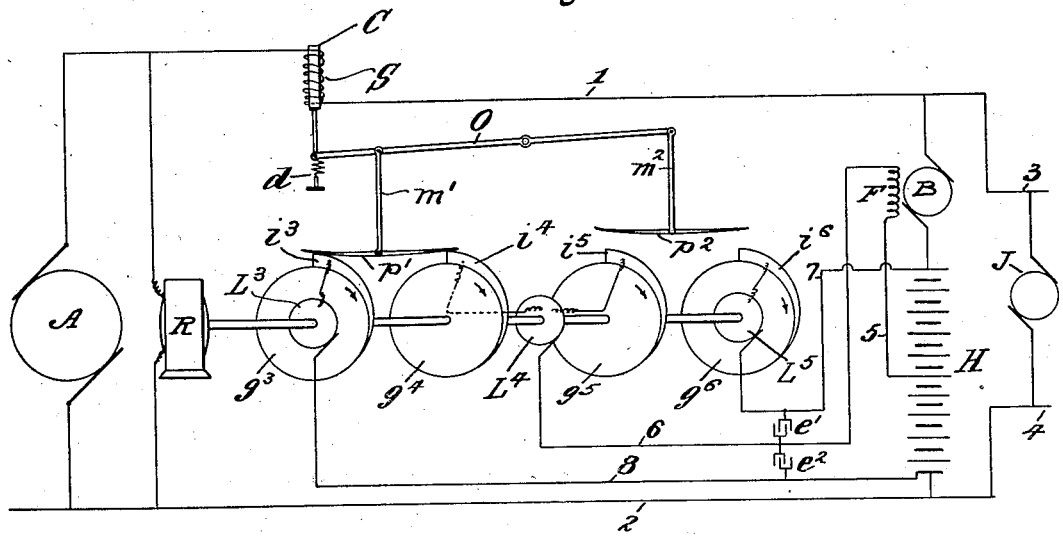
Figure 4:
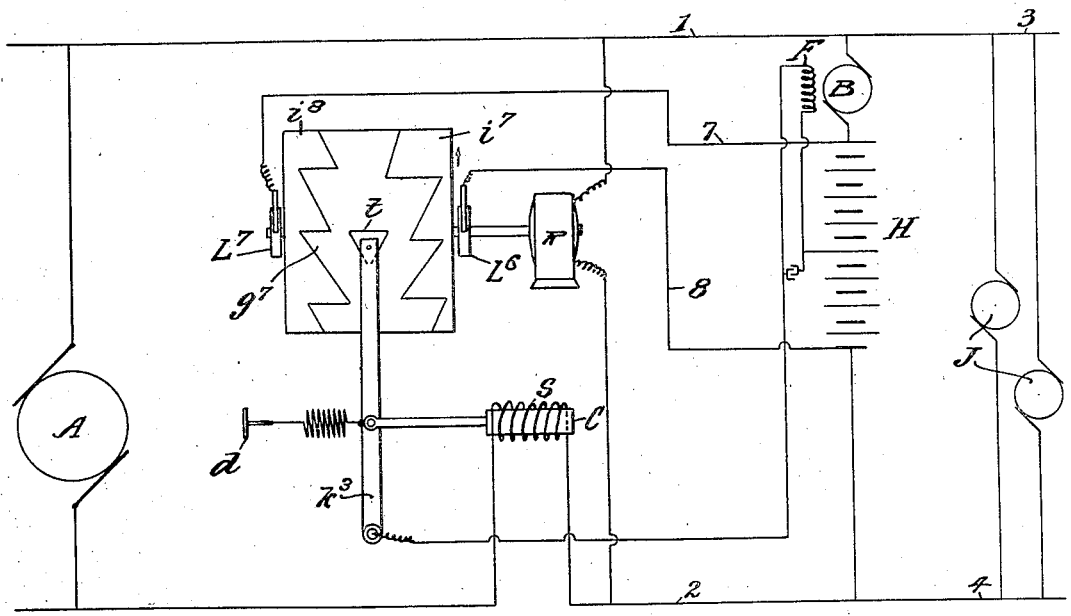

Figure 1, illustrates features of the invention, and Figs. 2, 3, and 4, illustrate modifications of the invention.

In these figures A, is a generator supplying current to the circuit 1—2, to which circuit is connected a consumption circuit 3—4, having a variable load, as for example—that of the motors J. Connected to the circuit 1—2, in parallel with the generator A, is shown a storage battery H, and in series therewith its supplemental booster B. The field of the booster is shown at F. A make and break device is shown consisting of one or more circular disks, rotated by suitable means, as for example, the motor R, which may be driven from the circuit 1—2. Any other means for driving these rotating disks may however be adopted.

In Fig. 1, one of these disks is shown at $g$. On the periphery of this disk is a conducting contact piece $i$, which covers only a portion of said periphery, and increases in thickness from one end to the other. It is connected to a collector ring L mounted on the same shaft as the disk, and by means of the conductor 6, and a suitable brush this contact piece $i$, is connected to one end of the booster field F, the other end of said field being connected by the conductor 5, to the middle point of the battery. Two flexible contact strips $k^1$ and $k^2$, are shown pivoted at $n^1$ and $n^2$, respectively, and so arranged that they may be brought in contact at their other ends with the contact piece $i$, as it is rotated on the disk $g$. The contact strips $k^1$ and $k^2$, are connected by the rods $m^1$ and $m^2$, to the bar $m$, which latter is suspended from the iron core C of a solenoid S, connected into the conductor $l$. The force exerted by current in the solenoid S on the core C is opposed by an adjustable spring $d$. The contact strips $k^1$ and $k^2$ are so arranged that only one of these can make contact with the contact piece $i$, for any given position of the bar $m$. In the position shown in the drawings $k^1$ will make such contact with every revolution of the disk $g$, while the contact strip $k^2$, is too far removed from the disk to make contact with $i$. In this position of the bar $m$, an intermittent current will be sent from the middle point of the battery through the booster field via 5, 6, L, $i$, $k^1$ and 8 to one terminal of the battery. The duration of the contact between $k^1$ and $i$, and therefore the average strength of this intermittent current will vary with the position of the bar $m$, being greater when the bar $m$, is depressed, and less when it is raised. The position of the bar $m$, shown in the drawing corresponds with a load on the circuit 3—4 less than the average, and the direction of current in the booster field will in this position be such as to cause the battery to charge. If the load on 3—4, should increase, a small portion of this increase of load getting back to the generator A, through the solenoid S, will raise the bar $m$, reducing the average strength of current in the field F. If the bar $m$, is sufficiently raised, the contact strip $k^1$ will be thrown entirely out of contact with $i$, while the contact strip $k^2$, will be thrown into contact, thus sending current through the booster field in the reverse direction from the opposite terminal of the battery via 7, $k^2$, $i$, L, 6 and 5. Thus, small fluctuations of load falling on the generator will, by their action on the core C, and the resulting changes in the position of the bar $m$, produce such changes in the amount and direction of the booster voltage, as will cause the battery to charge and discharge, relieving the generator of the balance of the fluctuations of load on the consumption circuit 3—4.

The apparatus shown in Fig. 2, operates in a similar manner. In this figure, however, two revolving disks $g^1$ and $g^2$ are shown, on which are mounted respectively the contact pieces $i^1$ and $i^2$ connected to the collector rings $L^1$ and $L^2$. The contact strip $k^1$ may be brought into contact with $i^1$, while the contact strip $k^2$ may be brought into contact with $i^2$ by means of the pivoted lever O, and the rods $m^1$ and $m^2$. The position of the lever O varies in response to changes of voltage across the circuit 1—2, by means of the solenoid S connected across said circuit, to whose iron core C, the lever O, is connected. If the voltage across S, increases due for example, to a decrease of load on 3—4, the contact strip $k^1$, is depressed and brought into contact with $i^1$, in which position current flows through the booster field via 5, 6, $k^1$, $i^1$, $L^1$, and 8 in the direction to cause the battery to charge. If the voltage across S, decreases, the contact strip $k^1$, will be raised, while $k^2$ will be lowered until the latter makes contact with $i^2$ and the current in the field is reversed, passing through 7, $L^2$, $i^2$, $k^2$, 6, and 5. In this figure the contact pieces $i^1$ and $i^2$ are shown mounted at opposite points on the disks $g^1$ and $g^2$, thereby reducing the possibility of short-circuit.

In Fig. 3, are shown four revolving disks $g^3$, $g^4$, $g^5$, $g^6$, carrying the contact pieces $i^3$, $i^4$, $i^5$, and $i^6$, respectively. The contact pieces $i^4$ and $i^5$, are both connected to the collector ring $L^4$, which by a suitable brush, and the conductor 6, is connected to one terminal of the booster field, the other terminal being connected to the middle point of the battery by means of the conductor 5. $i^3$, is connected by means of the collector ring $L^3$, and a suitable brush, and conductor 8 to one end of the battery, while $i^6$ is connected by collector ring $L^5$ and conductor 7 to the other end of the battery. The pivoted lever O carries on one end a rod $m^2$, which supports a flexible contact strip $p^2$, so arranged that when depressed it will make contact between $i^5$ and $i^6$, thus connecting the booster field via 5, 6, $L^4$, $i^5$, $p^2$, $i^6$, $L^5$, and 7, to one end of the battery. At the other end of the lever O, is a similar rod $m^1$ and contact strip $p^1$, which when depressed will connect the booster field to the other end of the battery, the current then flowing in the reverse direction via 5, 6, $L^4$, $i^4$, $p^1$, $i^3$, $L^3$, and 8. The position of the lever O, as in the other figures, is determined by the force exerted on the core C, by the solenoid S, opposed by the adjustable spring $d$, and the booster field excitation will, therefore, respond in amount and direction to fluctuations of current in the solenoid S.

Condensers $e$, $e^1$ and $e^2$, are shown to suppress the spark when the circuit is opened. The condenser $e$, shown in Fig. 1, is connected across the terminals of the booster field and serves to maintain the current in this field for an instant after the contact with $i$, is broken, thus avoiding the high reactive voltage which would result if the current in this field were suddenly interrupted. In Figs. 2, and 3, the condensers $e^1$ and $e^2$ are connected across the break in the circuit when the contact is opened, and serve a similar purpose.

In Fig. 4, the contact pieces $i^7$ and $i^8$ are arranged on the surface of a cylindrical drum $g^7$, and are connected to the opposite terminals of the battery by means of the collector rings $L^6$ and $L^7$ and the conductors 7 and 8. The contact pieces $i^7$ and $i^8$ are toothed on their inner edges as shown, the points of the several teeth being at varying distances from the respective heads of the drum $g^7$. The contact arm $k^3$, rests at one end upon the surface of the cylindrical drum $g^7$, and is pivoted at the other end in such a way that the end in contact with the cylindrical drum is free to move in the direction of the axis of the cylinder. The position of this contact arm is determined by the spring $d$, acting against the attraction of the solenoid S, on the core C, in the same manner as described in connection with Fig. 1. Contact between the arm $k^3$ and the cylinder $g^7$ is made by means of a contact piece $t$, carried on the end of the arm whose edges are parallel with the lines of the teeth of the contact pieces $i^7$ and $i^8$. The width of the contact piece $t$, at its widest point is such that in the mean position of the arm $k^3$ it just avoids contacting with both $i^7$ and $i^8$, as the drum $g^7$, is revolved. If the adjustment is such that with a given current in the solenoid S, the arm $k^3$ is held in its mean position there will be no current flowing in the field F, of the booster. If the current in the solenoid S, increases slightly, due for example, to an increase of load on the circuit 3—4, the arm $k^3$ will be moved to the right making contact with some of the teeth of the contact piece $i^7$, thereby applying intermittently to the field F, a voltage equal to half that of the battery and producing in the booster B, a voltage in the direction to cause the battery to discharge and take the balance of the increase of load on 3—4. If the load increases still further, arm $k^3$ will be drawn still farther to the right. The first effect of this will be to increase the duration of contact between the contact pieces $t$ and $i^7$. If the arm $k^3$ is moved to the right sufficiently, additional teeth will be brought into contact with $t$, so that not only will the duration of each contact be increased, but a greater number of contacts will be made with each revolution of the arm $g^7$ and the effect on the booster voltage will be greatly increased. If, on the other hand, the current of the solenoid S, should decrease, the arm $k^3$ will be drawn to the left until contact is made between $t$ and the teeth of $i^8$, which latter being connected to the opposite terminal of the battery will send current through the booster field in the opposite direction causing the battery to charge.

Having thus described the nature and objects of my invention, what I claim as new and desire to secure by Letters Patent is

1. In combination the field winding of a dynamo electric machine, a source of field excitation sufficient if permanently applied to the field winding to produce excessive field strength, means for intermittently connecting the source to the field winding, said means comprising a stationary contact adjustable in position, and a rotating contact of irregular shape such that a change in the adjustment of the stationary contact will vary the number of contacts in a given time between the two, and means for adjusting the position of the stationary contact.

2. In combination a storage battery, a booster, an electrical circuit, make and break device operatively independent of changes in the electrical condition of the circuit and adapted to apply intermittently to the booster field a voltage sufficient if permanently applied to provide booster excitation in excess of the operative requirements, means responsive to such changes and adapted to control the make and break device to vary the polarity and relative duration of make and break, and a condenser connected across the terminals of the booster field.

In testimony whereof I have hereunto signed my name.

JOSEPH LESTER WOODBRIDGE.

Witnesses:
W. J. JACKSON,
FRANK E. FRENCH.